US012668675B2

(12) United States Patent
Shin et al.

(10) Patent No.: US 12,668,675 B2
(45) Date of Patent: Jun. 30, 2026

(54) SURFACE PROTECTIVE FILM, OPTICAL MEMBER COMPRISING THE SAME, AND DISPLAY APPARATUS COMPRISING THE SAME

(71) Applicant: SAMSUNG SDI CO., LTD., Yongin-si (KR)

(72) Inventors: Dong Myeong Shin, Suwon-si (KR); Sung Hyun Mun, Suwon-si (KR); Kyoung Gon Park, Suwon-si (KR); Il Jin Kim, Suwon-si (KR); Do Young Kim, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 894 days.

(21) Appl. No.: 17/574,298

(22) Filed: Jan. 12, 2022

(65) Prior Publication Data

US 2022/0220271 A1     Jul. 14, 2022

(30) Foreign Application Priority Data

Jan. 12, 2021     (KR) ........................ 10-2021-0004292

(51) Int. Cl.
| | |
|---|---|
| *C08J 7/046* | (2020.01) |
| *C08F 2/22* | (2006.01) |
| *C08K 3/36* | (2006.01) |
| *C09J 183/06* | (2006.01) |
| *G02B 1/04* | (2006.01) |
| *G02B 1/14* | (2015.01) |
| *B82Y 40/00* | (2011.01) |

(52) U.S. Cl.
CPC ................ *C08J 7/046* (2020.01); *C08F 2/22* (2013.01); *C08K 3/36* (2013.01); *C09J 183/06* (2013.01); *G02B 1/04* (2013.01); *G02B 1/14* (2015.01); *B82Y 40/00* (2013.01); *C08J 2375/06* (2013.01); *C08K 2201/003* (2013.01); *C08K 2201/005* (2013.01); *C08K 2201/011* (2013.01); *C09J 2467/005* (2013.01)

(58) Field of Classification Search
None
See application file for complete search history.

(56) References Cited

U.S. PATENT DOCUMENTS

| | | | | |
|---|---|---|---|---|
| 2004/0081831 A1* | 4/2004 | Shoshi | ..................... | C08J 7/046 428/480 |
| 2016/0122599 A1* | 5/2016 | Kim | .......................... | C09J 7/10 428/354 |
| 2019/0169388 A1* | 6/2019 | Kim | ...................... | C08J 7/0427 |

FOREIGN PATENT DOCUMENTS

| | | |
|---|---|---|
| JP | 2016-060117 A | 4/2016 |
| KR | 10-2018-0096448 A | 8/2018 |
| KR | 10-2020-0006442 A | 1/2020 |

OTHER PUBLICATIONS

Korean Office Action dated Jan. 10, 2023 issued in corresponding Korean Patent Application No. 10-2021-0004292 (6 pages).

* cited by examiner

*Primary Examiner* — Alicia Chevalier
*Assistant Examiner* — Thomas A Mangohig
(74) *Attorney, Agent, or Firm* — Womble Bond Dickinson (US) LLP

(57) ABSTRACT

A surface protective film, an optical member including the same, and a display apparatus including the same are provided. A surface protective film includes: a hard coating layer, a base layer, and an adhesive layer sequentially stacked in the stated order, and a laminate of the hard coating layer and the base layer may have a storage modulus of about 900 MPa to about 1500 MPa at −20° C. and a storage modulus of about 15 MPa to about 100 MPa at 85° C.

20 Claims, No Drawings

SURFACE PROTECTIVE FILM, OPTICAL MEMBER COMPRISING THE SAME, AND DISPLAY APPARATUS COMPRISING THE SAME

CROSS-REFERENCE TO RELATED APPLICATION

This application claims priority to and the benefit of Korean Patent Application No. 10-2021-0004292, filed on Jan. 12, 2021 in the Korean Intellectual Property Office, the entire disclosure of which is incorporated herein by reference.

BACKGROUND

1. Field

Aspects of embodiments of the present invention relate to a surface protective film, an optical member including the same, and a display apparatus including the same.

2. Description of the Related Art

Currently, development of a foldable display apparatus has been realized. Thus, a surface protective film has been developed to protect the foldable display apparatus, particularly a window film, from an external environment. Although a typical surface protective film has been manufactured with a priority on protection from the external environment and rework characteristics, the typical surface protective film fails to realize flexibility and thus cannot be applied to a foldable display apparatus.

The surface protective film is disposed on the outermost surface of the display apparatus. Accordingly, the surface protective film is required to have not only flexibility but also impact resistance. The surface protective film includes a base layer and a hard coating layer stacked on a surface of the base layer. However, since the base layer generally does not exhibit adhesive properties, the surface protective film is attached to an optical element via an adhesive layer. A film composed of a base layer and a hard coating layer does not suffer from a problem of impact resistance, whereas a film composed of an adhesive layer, a base layer, and a hard coating layer can exhibit different impact resistance depending upon the adhesive layer.

A thermoplastic polyurethane (TPU) film may be used as the base layer. However, the thermoplastic polyurethane film provides poor appearance due to gel formation and visible stripe patterns, causing a limitation in use on the outermost surface of the display apparatus. In particular, as the screen size of the display apparatus is maximized or increased and high screen resolution is required, poor appearance can be easily identified.

The background technique of the present invention is disclosed in Japanese Unexamined Patent Publication No. 2016-060117 and the like.

SUMMARY

According to an aspect of embodiments of the present invention, a surface protective film that has good properties in terms of impact resistance and folding reliability at low temperature and high temperature is provided.

According to another aspect of embodiments of the present invention, a surface protective film that has improved properties in terms of wear resistance, scratch resistance, and slip resistance is provided.

According to a further aspect of embodiments of the present invention, a surface protective film having good appearance is provided.

One or more aspects of the present invention relate to a surface protective film.

According to one or more embodiments of the present invention, a surface protective film includes a hard coating layer, a base layer, and an adhesive layer sequentially stacked in the stated order, wherein a laminate of the hard coating layer and the base layer may have a storage modulus of about 900 MPa to about 1,500 MPa at −20° C. and a storage modulus of about 15 MPa to about 100 MPa at 85° C.

According to one or more embodiments of the present invention, a surface protective film includes a hard coating layer, a base layer, and an adhesive layer sequentially stacked in the stated order, wherein the base layer includes a polyurethane film formed by solution casting and has a Young's modulus of about 80 MPa to about 500 MPa at 25° C.

In one or more embodiments, the laminate of the hard coating layer and the base layer may have a storage modulus of about 900 MPa to about 1,500 MPa at −20° C. and a storage modulus of about 15 MPa to about 100 MPa at 85° C.

In one or more embodiments, the base layer may include a cast polyurethane film, a polyimide film, or a polyethylene terephthalate film.

In one or more embodiments, the base layer may have a thickness of about 75 μm to about 200 μm.

In one or more embodiments, the base layer may have a fracture elongation of about 200% or more at 25° C.

In one or more embodiments, the base layer may have a storage modulus of about 900 MPa to about 1,500 MPa at −20° C. and a storage modulus of about 15 MPa to about 100 MPa at 85° C.

In one or more embodiments, the base layer may have a haze of about 1% or less.

In one or more embodiments, the adhesive layer may have a storage modulus of about 10 kPa to about 500 kPa at −20° C. and a storage modulus of about 10 kPa to about 500 kPa at 60° C.

In one or more embodiments, the adhesive layer may include a (meth)acrylic adhesive layer formed of an adhesive composition including: a monomer mixture for a hydroxyl group-containing (meth)acrylic copolymer; particles or a particle mixture including at least one selected from among organic particles and inorganic particles; and an initiator, or a silicone-based adhesive layer formed of an adhesive composition including an alkenyl group-containing organopolysiloxane.

In one or more embodiments, the organic particles may include core-shell type organic nanoparticles.

In one or more embodiments, the core-shell type organic nanoparticles may satisfy the following Relation (1):

$$Tg(c) < Tg(s), \qquad (1)$$

where $Tg(c)$ is a glass transition temperature (unit: ° C.) of the core, and $Tg(s)$ is a glass transition temperature (unit: ° C.) of the shell.

In one or more embodiments, the inorganic particles may include at least one selected from among metal oxides, metal titanates, sulfides, selenides, and tellurides.

In one or more embodiments, the monomer mixture may include about 5% by weight (wt %) to about 40 wt % of a hydroxyl group-containing (meth)acrylate and about 60 wt % to about 95 wt % of a comonomer.

In one or more embodiments, the alkenyl group-containing organopolysiloxane may include at least one selected from among a component (i) and a component (ii), wherein
the component (i) comprises organopolysiloxane having at least one Si-coupled $C_3$ to $C_{10}$ alkenyl group per molecule; and
the component (ii) comprises organopolysiloxane having at least one Si-coupled vinyl group per molecule.

In one or more embodiments, the hard coating layer may be formed of a urethane (meth)acrylate-based hard coating composition including: a first urethane (meth)acrylate oligomer; a second urethane (meth)acrylate oligomer; a (meth)acrylate monomer; alumina; an initiator; and at least one selected from among a fluorine-based additive and a silicone-based additive.

In one or more embodiments, the hard coating layer may have a water contact angle of about 100° or more at 25° C.

One or more further aspects of the present invention relate to an optical member.

In one or more embodiments, an optical member includes the surface protective film according to the present invention.

In one or more embodiments, the optical member may include a window film and the surface protective film formed on a surface of the window film.

One or more further aspects of the present invention relate to a display apparatus including the surface protective film according to an embodiment of the present invention.

DETAILED DESCRIPTION

Herein, some embodiments of the present invention will be described in further detail.

Herein, "(meth)acryl" refers to acryl and/or methacryl.

Herein, "storage modulus" of an adhesive layer was measured under auto-strain conditions of 1% strain while increasing the shear rate from 0.1 rad/sec to 100 rad/sec using a dynamic viscoelasticity instrument (ARES G2, TA Instrument). The storage modulus was measured while raising the temperature from −20° C. to 90° C. at a heating rate of 5° C./min. In measurement of storage modulus, a specimen was prepared by stacking a 500 μm thick adhesive layer, followed by punching a laminate using a puncher having a diameter of 8 mm.

Herein, "Young's modulus" of a base layer was evaluated on a V-type specimen in accordance with ASTM D638, specifically through a tensile test experiment at 25° C. and at a rate of 100 mm/min using a UTM system (Intron Technology Co., Ltd.).

Herein, "storage modulus" of a base layer was measured with respect to the base layer using a dynamic mechanical analyzer (DMA), specifically in a tension test mode at a frequency of 1 Hz while raising the temperature from −70° C. to 120° C. at a heating rate of 2° C./min, and means storage modulus at −20° C. and storage modulus at 85° C.

Herein, "storage modulus" of a laminate of a hard coating layer and a base layer was measured with respect to the laminate using a dynamic mechanical analyzer (DMA), specifically in a tension test mode at a frequency of 1 Hz while raising the temperature from −70° C. to 120° C. at a heating rate of 2° C./min, and means storage modulus at −20° C. and storage modulus at 85° C.

Herein, an average particle diameter of organic particles means a particle diameter of the organic particles, as measured in a water-based solvent or an organic solvent using a Zetasizer nano-ZS (Malvern Inc.) and represented in a unit of Z-average value, and a particle diameter thereof confirmed through SEM/TEM observation.

Herein, an average particle diameter of inorganic particles refers to D50, as measured using a particle analyzer. D50 may be measured using the particle analyzer after the inorganic particles are dispersed in a solvent at 25° C. for 3 minutes, or may be obtained with reference to commercially available catalogues.

As used herein to represent a specific numerical range, the expression "X to Y" means "X≤ and ≤Y".

A surface protective film according to embodiments of the present invention has good folding reliability at both low temperature and high temperature and achieves significant improvement in impact resistance, wear resistance, and scratch resistance. Accordingly, the surface protective film according to embodiments of the present invention may be disposed on the outermost surface of a display apparatus to protect various optical elements, for example, a window film and the like, inside the display apparatus from external impact, and may be applicable to a foldable display apparatus. In one or more embodiments, the surface protective film may be used as a surface protective film for protection of the window film.

The surface protective film according to embodiments of the present invention achieves significant improvement in impact resistance and has good folding reliability at low temperature and high temperature. Accordingly, the surface protective film according to embodiments of the present invention had an impact resistance evaluation result of 18 cm or more, for example, 18 cm to 30 cm, as measured by a method described in an experimental example, and did not suffer from lifting, peeling, and/or bubble generation even after 100,000 or more cycles of folding and unfolding in folding reliability evaluation at −20° C. and 60° C., as measured by a method described in an experimental example.

In particular, even with an adhesive layer described below, the surface protective film according to embodiments of the present invention achieves significant improvement in impact resistance. As described below, the surface protective film includes a hard coating layer, a base layer, and an adhesive layer sequentially stacked in the stated order, and impact resistance of the surface protective film is measured at the hard coating layer side. In general, since the adhesive layer is softer than the hard coating layer and the base layer, impact resistance can be partially affected even by the adhesive layer. The adhesive layer is an essential layer for attachment of the surface protective film to an optical element and thus is taken into account in evaluation of impact resistance.

The surface protective film according to embodiments of the present invention has good appearance. Herein, "good appearance" means that, when the surface protective film is irradiated with light at the hard coating layer side, the entirety of the surface protective film does not exhibit any stripe pattern, gel, and/or opaqueness. The stripe pattern, gel, and/or opaqueness can be generated by the base layer, the hard coating layer, or the adhesive layer alone or by combination of the base layer, the hard coating layer, and the adhesive layer. The appearance of the surface protective film can be affected by all of the base layer, the hard coating layer, and the adhesive layer. The surface protective film according to embodiments of the present invention provides good appearance through control of all of the base layer, the hard coating layer, and the adhesive layer.

A surface protective film according to an embodiment of the present invention includes a hard coating layer, a base layer, and an adhesive layer sequentially stacked in the stated order. In an embodiment, the surface protective film has a tri-layer structure, wherein the hard coating layer is directly formed on the base layer and the adhesive layer is directly formed on the base layer. Here, "directly formed" means that no other adhesive layer or bonding layer is interposed between the base layer and the hard coating layer and between the base layer and the adhesive layer.

In the surface protective film, a laminate of the base layer and the hard coating layer has a storage modulus of about 900 MPa to about 1,500 MPa at −20° C. and a storage modulus of about 15 MPa to about 100 MPa at 85° C. As a result, the surface protective film achieves significant improvement in impact resistance and in folding reliability at both high temperature and low temperature, as compared with a typical surface protective film. When the laminate of the base layer and the hard coating layer has storage moduli at −20° C. and 85° C. within the above specified ranges, the surface protective film can have the effects of the present invention.

The storage moduli of the laminate of the base layer and the hard coating layer at −20° C. and 85° C. may be achieved by forming the hard coating layer using a hard coating composition described below while controlling Young's modulus of the base layer. In one or more embodiments, the above storage moduli are achieved by additionally controlling thicknesses of the base layer and the hard coating layer.

In one or more embodiments, the base layer is formed using a cast polyurethane film. The surface protective film according to embodiments of the present invention can achieve significant improvement in impact resistance and folding reliability, as compared with a surface protective film including a typical polyurethane film.

For example, the laminate of the base layer and the hard coating layer may have a storage modulus of 900 MPa, 950 MPa, 1,000 MPa, 1,050 MPa, 1,100 MPa, 1,150 MPa, 1,200 MPa, 1,250 MPa, 1,300 MPa, 1,350 MPa, 1,400 MPa, 1,450 MPa, or 1,500 MPa, as measured at −20° C., and a storage modulus of 15 MPa, 20 MPa, 25 MPa, 30 MPa, 35 MPa, 40 MPa, 45 MPa, 50 MPa, 55 MPa, 60 MPa, 65 MPa, 70 MPa, 75 MPa, 80 MPa, 85 MPa, 90 MPa, 95 MPa, or 100 MPa, as measured at 85° C.

In one or more embodiments, the laminate of the base layer and the hard coating layer has a storage modulus of 900 MPa to 1,200 MPa, and, in an embodiment, 1,100 MPa to 1,500 MPa, at −20° C. Within this range, it is possible to secure the effects of the present invention while allowing easy manufacture of the laminate of the base layer and the hard coating layer.

In one or more embodiments, the laminate of the base layer and the hard coating layer has a storage modulus of 50 MPa to 90 MPa, and, in an embodiment, 60 MPa to 80 MPa, at 85° C. Within this range, it is possible to secure the effects of the present invention while allowing easy manufacture of the laminate of the base layer and the hard coating layer.

Base Layer

The base layer is interposed between the hard coating layer and the adhesive layer to support the hard coating layer and the adhesive layer while improving impact resistance and folding reliability at low temperature and high temperature. The base layer can assist in improvement in impact resistance and folding reliability of the surface protective film including the adhesive layer described below.

The base layer may have a Young's modulus of about 80 MPa to about 500 MPa at 25° C. Within this range, the base layer can assist in improvement in impact resistance and flexibility at low temperature and high temperature.

For example, the base layer may have a Young's modulus of 80 MPa, 85 MPa, 90 MPa, 95 MPa, 100 MPa, 105 MPa, 110 MPa, 115 MPa, 120 MPa, 125 MPa, 130 MPa, 135 MPa, 140 MPa, 145 MPa, 150 MPa, 155 MPa, 160 MPa, 165 MPa, 170 MPa, 175 MPa, 180 MPa, 185 MPa, 190 MPa, 195 MPa, 200 MPa, 300 MPa, 400 MPa, or 500 MPa, as measured at 25° C. In an embodiment, the base layer has a Young's modulus of 80 MPa to 300 MPa, and, in an embodiment, 100 MPa to 200 MPa, at 25° C.

In an embodiment, the base layer may have a storage modulus of about 900 MPa to about 1,500 MPa, and, in an embodiment, 900 MPa to 1,200 MPa, at −20° C. Within this range, the base layer can facilitate a film manufacturing process while securing good folding reliability at low temperature. For example, the base layer may have a storage modulus of 900 MPa, 950 MPa, 1,000 MPa, 1,050 MPa, 1,100 MPa, 1,150 MPa, 1,200 MPa, 1,250 MPa, 1,300 MPa, 1,350 MPa, 1,400 MPa, 1,450 MPa, or 1,500 MPa, as measured at −20° C.

In an embodiment, the base layer may have a storage modulus of about 15 MPa to about 100 MPa, and, in an embodiment, 50 MPa to 90 MPa, at 85° C. Within this range, the base layer can facilitate the film manufacturing process while securing good folding reliability under high temperature/high humidity conditions. For example, the base layer may have a storage modulus of 15 MPa, 20 MPa, 25 MPa, 30 MPa, 35 MPa, 40 MPa, 45 MPa, 50 MPa, 55 MPa, 60 MPa, 65 MPa, 70 MPa, 75 MPa, 80 MPa, 85 MPa, 90 MPa, 95 MPa, or 100 MPa, as measured at 85° C.

In an embodiment, the base layer may be formed of a cast polyurethane (CPU) film formed by a solution casting method. When the base layer is formed of a cast polyurethane (CPU) film produced by the solution casting method and having the above Young's modulus at 25° C., it is possible to achieve significant improvement in impact resistance and flexibility at low temperature and high temperature. With a base layer not having a Young's modulus of 80 MPa to 500 MPa at 25° C. or including a polyurethane film formed by a certain method, for example, melt extrusion and the like, instead of the solution casting method, the surface protective film has much lower impact resistance and folding reliability than the surface protective film according to embodiments of the present invention and exhibits poor appearance.

The solution casting method is a process of manufacturing a polyurethane film by applying a solution containing a polyurethane resin (a polyol, an isocyanate curing agent, additives, and the like) and a solvent to a non-adhesive surface, followed by volatilization of the solvent at high temperature and heat curing. The inventors of the present invention confirmed that a polyurethane film produced by the solution casting method has high modulus even with the same thickness, thereby achieving significant improvement in impact resistance while providing good appearance, as compared with a thermoplastic polyurethane (TPU) film produced by a typical melt extrusion method. When irradiated with light, the cast polyurethane (CPU) film produced by the solution casting method does not exhibit any stripe pattern, gel, and/or opaqueness and thus can assist in improvement in external appearance of the surface protective film, as compared with the thermoplastic polyurethane (TPU) film produced by the typical melt extrusion method.

The polyurethane resin may be prepared from a bi- or higher polyfunctional polyol and a bi- or higher polyfunctional isocyanate. The polyol may include at least one selected from among an aromatic polyol, an aliphatic polyol, and an alicyclic polyol. In an embodiment, the polyol is polyurethane formed of the aliphatic polyol and/or the alicyclic polyol. The polyol may include at least one selected from among a polyester diol, a polycarbonate diol, a polyolefin diol, a polyether diol, a polythioether diol, a polysiloxane diol, a polyacetal diol, and a polyester amide diol, without being limited thereto. The poly functional isocyanate may include any aliphatic, alicyclic or aromatic isocyanate. A chain extender may include diols, for example, aliphatic diols, amino alcohols, diamines, hydrazines, hydrazides, or mixtures thereof. In preparation of the thermoplastic polyurethane, a tin compound, for example, a tin salt of carboxylic acid, an amine, for example, dimethylcyclohexylamine or triethylenediamine, and the like may be further included as a catalyst for promoting formation of a urethane bond. Other typical components, such as a surfactant, a flame retardant, fillers, pigments, and the like, may be further included in preparation of the thermoplastic polyurethane.

In another embodiment, the base layer may include a polyimide film and/or a polyethylene terephthalate film.

The base layer having a Young's modulus of about 80 MPa to about 500 MPa at 25° C. may be obtained by adjusting the molecular weights of raw materials for the base layer, such as a polyol, polyimide, polyethylene terephthalate, and the like, in formation of the base layer. A method of adjusting the molecular weights of raw materials for the base layer, such as a polyol and the like, is well known to those skilled in the art.

In an embodiment, the base layer may have a fracture elongation of about 200% or more, for example, 200%, 250%, 300%, 350%, 400%, 450%, 500%, 550%, 600%, 650%, 700%, 750%, 800%, and, in an embodiment, 200% to 800%, and, in an embodiment, 400% to 800%, as measured at 25° C. Within this range, it is possible to secure folding reliability.

In an embodiment, the base layer may have a haze of about 1% or less, and, in an embodiment, 0.5% or less, as measured using a haze meter at a wavelength of 380 nm to 780 nm in accordance with ASTM D 1003-95 5 ("Standard Test for Haze and Luminous Transmittance of Transparent Plastic"). Within this range, the base layer can provide a surface protective film capable of securing good appearance without gel formation and the like.

In an embodiment, the base layer may have a thickness of about 75 μm to about 200 μm, and, in an embodiment, 100 μm to 150 μm. Within this range, the base layer can provide a thin surface protective film capable of improving impact resistance and folding reliability.

Hard Coating Layer

The hard coating layer is formed on a surface of the base layer and can assist the surface protective film in achieving significant improvement in impact resistance and flexibility. The hard coating layer can assist the laminate of the base layer and the hard coating layer in achieving the above modulus.

The hard coating layer may be formed of a urethane (meth)acrylate-based hard coating composition that includes a first urethane (meth)acrylate oligomer, a second urethane (meth)acrylate oligomer, a (meth)acrylate monomer, alumina, and an initiator.

The first urethane (meth)acrylate oligomer has a lower elongation than the second urethane (meth)acrylate oligomer. According to embodiments of the present invention, the hard coating composition includes two types of urethane (meth)acrylate oligomers having different elongations to assist in improvement in impact resistance and folding reliability.

In an embodiment, the first urethane (meth)acrylate oligomer has a greater number of functional groups and a lower elongation than the second urethane (meth)acrylate oligomer, despite a smaller weight average molecular weight than the second urethane (meth)acrylate oligomer. According to embodiments of the present invention, the hard coating composition includes two types of urethane (meth) acrylate oligomers having different elongations to assist in improvement in impact resistance and folding reliability of the surface protective film.

In an embodiment, the first urethane (meth)acrylate oligomer is a hepta- to deca-functional (meth)acrylate oligomer and may have a weight average molecular weight of about 1,000 g/mol to less than about 4,000 g/mol and an elongation of about 1% to less than about 15%. Within this range, the first urethane (meth)acrylate oligomer assists in improvement in impact resistance, scratch resistance, and flexibility of the surface protective film. In an embodiment, the first urethane (meth)acrylate oligomer is a nona- to deca-functional (meth)acrylate oligomer and may have a weight average molecular weight of 1,500 g/mol to 2,500 g/mol and an elongation of 5% to 10%. Within this range, the surface protective film can achieve improvement in impact resistance, scratch resistance, foldability and wear resistance even with a thin hard coating layer.

In an embodiment, the second urethane (meth)acrylate oligomer is a tetra- to hexa-functional (meth)acrylate oligomer and may have a weight average molecular weight of about 4,000 g/mol to about 8,000 g/mol and an elongation of about 15% to about 25%. Within this range, the second urethane (meth)acrylate oligomer can assist in improvement in impact resistance, scratch resistance, and flexibility of the surface protective film. In an embodiment, the second urethane (meth)acrylate oligomer is a penta- to hexa-functional (meth)acrylate oligomer and may have a weight average molecular weight of 4,000 g/mol to 6,000 g/mol and an elongation of 15% to 20%. Within this range, the surface protective film can achieve improvement in impact resistance, scratch resistance, foldability and wear resistance even with a thin hard coating layer.

The second urethane (meth)acrylate oligomer may be present in a smaller amount than the first urethane (meth) acrylate oligomer. As a result, the first and second urethane (meth)acrylate oligomers can assist in improvement in impact resistance, scratch resistance, and flexibility of the surface protective film.

In an embodiment, the second urethane (meth)acrylate oligomer may be present in an amount of about 80% to about 200% of the first urethane (meth)acrylate oligomer. Within this range, the surface protective film can achieve improvement in impact resistance, scratch resistance, foldability, and stretching effects even with a thin hard coating layer.

In an embodiment, in terms of solid content, the first urethane (meth)acrylate oligomer may be present in an amount of about 10 parts by weight to about 50 parts by weight, and the second urethane (meth)acrylate oligomer may be present in an amount of about 40 parts by weight to about 80 parts by weight, relative to the total sum of 100 parts by weight of the first urethane (meth)acrylate oligomer, the second urethane (meth)acrylate oligomer, the (meth) acrylate monomer, and alumina. Within this range, the protective film can exhibit good properties in terms of impact resistance, scratch resistance, and foldability.

For example, the first urethane (meth)acrylate oligomer may be present in an amount of 10, 15, 20, 25, 30, 35, 40, 45, or 50 parts by weight, and the second urethane (meth)acrylate oligomer may be present in an amount of 40, 45, 50, 55, 60, 65, 70, 75, or 80 parts by weight.

In an embodiment, the first urethane (meth)acrylate oligomer may be present in an amount of 30 parts by weight to 50 parts by weight, for example, 30 parts by weight to 45 parts by weight, and the second urethane (meth)acrylate oligomer may be present in an amount of 40 parts by weight to 60 parts by weight. Within this range, the surface protective film can achieve improvement in impact resistance, scratch resistance, and foldability even with a thin hard coating layer.

Herein, "in terms of solid content" means the total amount of components excluding a solvent in the hard coating composition.

In an embodiment, each of the first urethane (meth)acrylate oligomer and the second urethane (meth)acrylate oligomer may be prepared through polymerization of a polyfunctional polyol, a polyfunctional isocyanate compound, and a hydroxyl group-containing (meth)acrylate compound. The polyfunctional polyol may include the aforementioned polyfunctional polyol, and the polyfunctional isocyanate compound may include the aforementioned polyfunctional isocyanate compound. The hydroxyl group-containing (meth)acrylate compound may include hydroxyethyl (meth)acrylate, pentaerythritol tri(meth)acrylate, dipentaerythritol penta(meth)acrylate, hydroxypropyl (meth)acrylate, hydroxybutyl (meth)acrylate, chlorohydroxypropyl (meth)acrylate, and hydroxyhexyl (meth)acrylate, without being limited thereto.

In an embodiment, the (meth)acrylate monomer is a bi- to hexa-functional (meth)acrylate monomer and can be cured together with the first urethane (meth)acrylate oligomer and the second urethane (meth)acrylate oligomer to increase hardness of the hard coating layer.

The (meth)acrylate monomer may include any of bifunctional (meth)acrylates, such as 1,4-butanediol di(meth)acrylate, hexanediol di(meth)acrylate, neopentyl glycol di(meth)acrylate, polyethylene glycol di(meth)acrylate, neopentyl glycol adipate di(meth)acrylate, dicyclopentanyl di(meth)acrylate, caprolactone-modified dicyclopentenyl di(meth)acrylate, ethylene oxide-modified di(meth)acrylate, di(meth)acryloxyethyl isocyanurate, allylated cyclohexyl di(meth)acrylate, tricyclodecane dimethanol (meth)acrylate, dimethylol dicyclopentane di(meth)acrylate, ethylene oxide-modified hexahydrophthalic acid di(meth)acrylate, tricyclodecane dimethanol (meth)acrylate, neopentyl glycol-modified trimethylpropane di(meth)acrylate, adamantane di(meth)acrylate, and 9,9-bis[4-(2-acryloyloxyethoxy)phenyl]fluorine; trifunctional (meth)acrylates, such as trimethylolpropane tri(meth)acrylate, dipentaerythritol tri(meth)acrylate, propionic acid-modified dipentaerythritol tri(meth)acrylate, pentaerythritol tri(meth)acrylate, propylene oxide-modified trimethylolpropane tri(meth)acrylate, and tris (meth)acryloxyethyl isocyanurate; tetrafunctional (meth)acrylates, such as diglycerin tetra(meth)acrylate and pentaerythritol tetra(meth)acrylate; pentafunctional (meth)acrylates, such as dipentaerythritol penta(meth)acrylate and the like; and hexafunctional (meth)acrylates, such as dipentaerythritol hexa(meth)acrylate, caprolactone-modified dipentaerythritol hexa(meth)acrylate, and the like, without being limited thereto. In an embodiment, the (meth)acrylate monomer is a trifunctional or tetra-functional (meth)acrylate monomer and can improve impact resistance and scratch resistance through adjustment of crosslinking density.

In an embodiment, the (meth)acrylate monomer may be present in an amount of about 1 part by weight to about 30 parts by weight, for example, 1, 5, 10, 15, 20, 25, or 30 parts by weight, and, in an embodiment, 5 parts by weight to 20 parts by weight, and, in an embodiment, 5 parts by weight to 15 parts by weight, relative to the total sum of 100 parts by weight of the first urethane (meth)acrylate oligomer, the second urethane (meth)acrylate oligomer, the (meth)acrylate monomer, and alumina. Within this range, the surface protective film can achieve improvement in impact resistance, scratch resistance, and foldability even with a thin hard coating layer.

In the hard coating layer, alumina serves to improve wear resistance and scratch resistance of the surface protective film. Although silica or zirconia particles may be used instead of alumina, alumina can achieve mechanical properties over the same surface area in a smaller amount than silica or zirconia.

In an embodiment, the alumina may include alumina particles having an average particle diameter (D50) of about 200 nm or less, for example, 1 nm, 5 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, 100 nm, 110 nm, 120 nm, 130 nm, 140 nm, 150 nm, 160 nm, 170 nm, 180 nm, 190 nm, or 200 nm, and, in an embodiment, 200 nm or less, and, in an embodiment, 5 nm to 100 nm. Within this range, it is possible to improve scratch resistance without deteriorating haze of the hard coating layer.

In an embodiment, alumina may be present in an amount of about 0.01 parts by weight to about 10 parts by weight, for example, 0.01, 0.05, 0.1, 1, 1.5, 2, 2.5, 3, 3.5, 4, 4.5, 5, 5.5, 6, 6.5, 7, 7.5, 8, 8.5, 9, 9.5, or 10 parts by weight, and, in an embodiment, 1 part by weight to 4 parts by weight, relative to the total sum of 100 parts by weight of the first urethane (meth)acrylate oligomer, the second urethane (meth)acrylate oligomer, the (meth)acrylate monomer, and alumina. Within this range, the surface protective film can achieve improvement in impact resistance, scratch resistance, and foldability even with a thin hard coating layer.

The initiator may include a photoinitiator and/or a heat initiator. In an embodiment, the initiator include a photoinitiator to secure surface uniformity of the hard coating layer by blocking shrinkage upon curing of the hard coating composition.

The initiator may include an acetophenone compound, a benzyl ketal type compound, or a mixture thereof, without being limited thereto. In an embodiment, the initiator is an acetophenone compound and is selected from among 2,2-dimethoxy-2-phenyl acetophenone, 2,2'-diethoxy acetophenone, 2,2'-dibuthoxy acetophenone, 2-hydroxy-2-methyl propiophenone, p-t-butyl trichloroacetophenone, p-t-butyl dichloroacetophenone, 4-chloroacetophenone, 2,2'-dichloro-4-phenoxy acetophenone, 2-methyl-1-(4-(methyl-thio)phenyl)-2-morpholinopropane-1-one, 2-benzyl-2-dimethylamino-1-(4-morpholinophenyl)-butane-1-one, and mixtures thereof.

In an embodiment, the initiator may be present in an amount of about 0.01 parts by weight to about 10 parts by weight, and, in an embodiment, 1 part by weight to 5 parts by weight, relative to the total sum of 100 parts by weight of the first urethane (meth)acrylate oligomer, the second urethane (meth)acrylate oligomer, the (meth)acrylate monomer, and alumina. Within this range, the initiator enables complete curing reaction and can secure good reactivity without bubble generation and deterioration in transmittance due to remaining initiator.

The hard coating composition may further include a fluorine-based additive and/or a silicone-based additive.

The fluorine-based additive improves wear resistance by improving surface characteristics of the hard coating layer, particularly slip resistance of the hard coating layer, and may include typical fluorine-based additives well-known to those skilled in the art. The fluorine-based additive may include a fluorine-modified (meth)acrylate and/or a fluorine-modified siloxane compound.

In an embodiment, the fluorine-based additive may be present in an amount of about 0.01 parts by weight to about 5 parts by weight, for example, 0.01, 0.05, 0.1, 1, 2, 3, 4, or 5 parts by weight, and, in an embodiment, 0.1 parts by weight to 2 parts by weight, relative to the total sum of 100 parts by weight of the first urethane (meth)acrylate oligomer, the second urethane (meth)acrylate oligomer, the (meth) acrylate monomer, and alumina. Within this range, the fluorine-based additive can improve surface characteristics of the hard coating layer without affecting other components.

The silicone-based additive improves surface characteristics of the hard coating layer and may include typical silicone-based additives well-known to those skilled in the art. For example, the silicone-based additive may include polyether-modified acrylic polydimethylsiloxane, without being limited thereto.

In an embodiment, the silicone-based additive may be present in an amount of about 0.01 parts by weight to about 5 parts by weight, for example, 0.01, 0.05, 0.1, 1, 2, 3, 4, or 5 parts by weight, and, in an embodiment, 0.1 parts by weight to 2 parts by weight, or 0.1 parts by weight to 1 part by weight, relative to relative to the total sum of 100 parts by weight of the first urethane (meth)acrylate oligomer, the second urethane (meth)acrylate oligomer, the (meth)acrylate monomer, and alumina. Within this range, the silicone-based additive can improve surface characteristics of the hard coating layer without affecting other components.

The hard coating composition may further include a solvent to improve coatability of the hard coating composition. The solvent may include methyl ethyl ketone and methyl isobutyl ketone, without being limited thereto. The hard coating composition may further include typical additives well-known to those skilled in the art to impart additional functions to the hard coating layer. The additives may include antioxidants, stabilizers, surfactants, pigments, antistatic agents, and leveling agents, without being limited thereto.

In an embodiment, the hard coating layer may have a thickness of about 1.5 μm to less than about 20 μm, and, in an embodiment, 2 μm to 10 μm. Within this range, the hard coating layer can improve impact resistance and scratch resistance of the surface protective film.

In an embodiment, the hard coating layer may have an index of refraction of about 1.40 to about 1.75, and, in an embodiment, 1.45 to 1.65. Within this range, the hard coating layer can have a suitable index of refraction with respect to the base layer to secure good optical characteristics of the surface protective film while improving screen visibility when the surface protective film is stacked on an upper side of the window film. In an embodiment, a difference in index of refraction between the hard coating layer and the base layer (index of refraction of the base layer— index of refraction of hard coating layer) may be 0.3 or less, for example, 0.01 to 0.2. Within this range, the surface protective film can be used in an optical display apparatus.

In an embodiment, the hard coating layer may have a water contact angle of about 100° or more, and, in an embodiment, 100° to 150°, as measured at 25° C. Within this range, the hard coating layer has good slip resistance to secure good wear resistance.

A functional layer may be further formed on an upper surface of the hard coating layer to provide additional functions to the surface protective film. For example, the functional layer may provide at least one function selected from among anti-reflection, low reflection, anti-glare, anti-fingerprint, anti-contamination, diffusion, and refraction functions. In an embodiment, the functional layer may be formed on the hard coating layer by coating a composition for the functional layer thereon or may be stacked on the hard coating layer via a bonding layer or an adhesive layer. In another embodiment, the functional layer may be realized by a surface of the hard coating layer.

Adhesive Layer

The adhesive layer is formed on a lower surface of the base layer to attach the surface protective film to an optical element.

In an embodiment, the adhesive layer may have a thickness of about 10 μm to about 50 μm, and, in an embodiment, 10 μm to 25 μm. Within this range, the adhesive layer can be used in the surface protective film without affecting flexibility.

In an embodiment, the adhesive layer may have a storage modulus of about 10 kPa to about 500 kPa, for example, 10 kPa, 20 kPa, 30 kPa, 40 kPa, 50 kPa, 60 kPa, 70 kPa, 80 kPa, 90 kPa, 100 kPa, 110 kPa, 120 kPa, 130 kPa, 140 kPa, 150 kPa, 160 kPa, 170 kPa, 180 kPa, 190 kPa, 200 kPa, 300 kPa, 400 kPa, or 500 kPa, and, in an embodiment, 10 kPa to 300 kPa, 10 kPa to 200 kPa, or 10 kPa to 150 kPa, as measured at −20° C. Within this range, the adhesive layer can improve folding reliability at low temperature while maintaining adhesion to the base layer.

In an embodiment, the adhesive layer may have a storage modulus of about 10 kPa to about 500 kPa, for example, 10 kPa, 20 kPa, 30 kPa, 40 kPa, 50 kPa, 60 kPa, 70 kPa, 80 kPa, 90 kPa, 100 kPa, 110 kPa, 120 kPa, 130 kPa, 140 kPa, 150 kPa, 160 kPa, 170 kPa, 180 kPa, 190 kPa, 200 kPa, 300 kPa, 400 kPa, or 500 kPa, and, in an embodiment, 10 kPa to 150 kPa, as measured at 60° C. Within this range, the adhesive layer can improve folding reliability at high temperature while maintaining adhesion to the base layer.

In an embodiment, the adhesive layer may have an index of refraction of about 1.45 to about 1.65, and, in an embodiment, 1.45 to 1.55. Within this range, the adhesive layer has a suitable index of refraction with respect to the base layer to secure good appearance of the surface protective film.

In an embodiment, the adhesive layer may have a peel strength of 40 gf/inch or more, and, in an embodiment, 50 gf/inch to 400 gf/inch, as measured with respect to an SUS surface at 25° C. using a peel strength tester (TA.XT_Plus Texture Analyzer, Stable Micro System Inc.) under conditions of a peeling angle of 180° and a peeling rate of 300 mm/min after coating an adhesive resin on the base layer, that is, the polyurethane film formed by the solution casting method. Within this range, the adhesive layer can secure good folding reliability and allows easy detachment from an outermost surface of a foldable display panel when attached thereto at room temperature.

The adhesive layer may include a layer formed of an adhesive composition including at least one selected from among a (meth)acrylic adhesive resin, a silicone-based adhesive resin, a urethane-based adhesive resin, and an epoxy-based adhesive resin. In an embodiment, the adhesive layer is formed of an adhesive composition including a (meth)acrylic adhesive resin or a silicone-based adhesive resin in terms of supply and demand, ease of manufacture, good appearance, and folding reliability.

The adhesive layer may be formed of the adhesive composition through photo-curing, heat curing, or a combination thereof. Photo-curing or heat curing may be performed by a typical method well-known to those skilled in the art.

In an embodiment, the adhesive layer may include a (meth)acrylic adhesive layer formed of an adhesive composition, which includes a monomer mixture for a hydroxyl group-containing (meth)acrylic copolymer; particles or a particle mixture including organic particles and/or inorganic particles; and an initiator.

The monomer mixture may include a hydroxyl group-containing (meth)acrylate; and a comonomer containing at least one selected from among an alkyl group-containing (meth)acrylate, an ethylene oxide-containing monomer, a propylene oxide-containing monomer, an amine group-containing monomer, an alkoxy group-containing monomer, a phosphoric acid group-containing monomer, a sulfonic acid group-containing monomer, a phenyl group-containing monomer, a silane group-containing monomer, a carboxylic acid group-containing monomer, and an amide group-containing (meth)acrylate.

The hydroxyl group-containing (meth)acrylate may include at least one selected from among 2-hydroxyethyl (meth)acrylate, 2-hydroxypropyl (meth)acrylate, 3-hydroxypropyl (meth)acrylate, 2-hydroxybutyl (meth)acrylate, 4-hydroxybutyl (meth)acrylate, 6-hydroxyhexyl (meth) acrylate, 1,4-cyclohexanedimethanol mono (meth)acrylate, 1-chloro-2-hydroxypropyl (meth)acrylate, diethylene glycol mono(meth)acrylate, 1,6-hexanediol mono(meth)acrylate, pentaerythritol tri(meth)acrylate, dipentaerythritol penta(meth)acrylate, neopentyl glycol mono(meth)acrylate, trimethylolpropane di(meth)acrylate, trimethylolethane di(meth) acrylate, 2-hydroxy-3-penyloxypropyl (meth)acrylate, 4-hydroxycyclopentyl (meth)acrylate, 4-hydroxycyclohexyl (meth)acrylate, and cyclohexanedimethanol mono(meth) acrylate.

The alkyl group-containing (meth)acrylate may include an unsubstituted $C_1$ to $C_{20}$ linear or branched alkyl (meth) acrylic acid ester. For example, the alkyl group-containing (meth)acrylate may include at least one selected from among methyl (meth)acrylate, ethyl (meth)acrylate, propyl (meth) acrylate, n-butyl (meth)acrylate, t-butyl (meth)acrylate, iso-butyl (meth)acrylate, pentyl (meth)acrylate, hexyl (meth) acrylate, heptyl (meth)acrylate, ethylhexyl (meth)acrylate, octyl (meth)acrylate, isooctyl (meth)acrylate, nonyl (meth) acrylate, decyl (meth)acrylate, lauryl (meth)acrylate, and isobornyl (meth)acrylate.

Each of the ethylene oxide-containing monomer, the propylene oxide-containing monomer, the amine group-containing monomer, the alkoxy group-containing monomer, the phosphoric acid group-containing monomer, the sulfonic acid group-containing monomer, the phenyl group-containing monomer, the silane group-containing monomer, the carboxylic acid group-containing monomer, and the amide group-containing (meth)acrylate may be selected from among typical types known to those skilled in the art.

In an embodiment, the monomer mixture includes about 5 wt % to about 40 wt %, and, in an embodiment, 10 wt % to 30 wt %, of the hydroxyl group-containing (meth)acrylate and about 60 wt % to about 95 wt %, and, in an embodiment, 70 wt % to 90 wt %, of the comonomer. Within this range, the monomer mixture can improve adhesive strength of the adhesive layer and flexibility at low temperature and high temperature.

In the adhesive layer, the particles serve to improve flexibility of the surface protective film at low temperature and/or high temperature or to assist in significant improvement in impact resistance of the surface protective film.

The organic particles can further improve reliability of the adhesive layer at high temperature by controlling modulus of the adhesive layer at high temperature to prevent or substantially prevent peeling, lifting, and/or bubble generation in the adhesive layer at high temperature. Organic nanoparticles have a high glass transition temperature to improve modulus of the adhesive layer at high temperature.

In an embodiment, the organic particles may be organic nanoparticles having an average particle diameter of about 10 nm to about 400 nm, and, in an embodiment, 10 nm to 300 nm, and, in an embodiment, 30 nm to 280 nm, and, in an embodiment, 50 nm to 280 nm. Within this range, the organic particles do not affect foldability of the adhesive layer and have a luminous transmittance of 90% or more in the visible spectrum to secure good transparency of the adhesive layer.

The organic particles may have a core-shell structure or a simple structure, such as bead type nanoparticles, without being limited thereto. The organic particles having a core-shell structure can improve folding reliability of the surface protective film at both low temperature and high temperature. That is, both the core and the shell may be organic particles. With the organic particles having the core-shell structure, the adhesive layer can exhibit good foldability and balance between elasticity and flexibility. The core and the shell satisfy the following Relation (1).

$$Tg(c) < Tg(s), \qquad (1)$$

where Tg(c) is the glass transition temperature (unit: ° C.) of the core, and Tg(s) is the glass transition temperature (unit: ° C.) of the shell.

In an embodiment, the core has a glass transition temperature of about −150° C. to 10° C., and, in an embodiment, about −150° C. to about −5° C., and, in an embodiment, about −150° C. to about −20° C. Within this range, the adhesive layer can have good viscoelasticity at low temperature and/or room temperature. The core may include at least one selected from among poly(alkyl (meth)acrylate), polysiloxane, and polybutadiene, each having the above glass transition temperature. The poly(alkyl (meth)acrylate) may include at least one selected from among poly(methyl acrylate), poly(ethyl acrylate), poly(propyl acrylate), poly (butyl acrylate), poly(isopropyl acrylate), poly(hexyl acrylate), poly(hexyl methacrylate), poly(ethylhexyl acrylate), poly(ethylhexyl methacrylate), and polysiloxane, without being limited thereto.

In an embodiment, the shell may have a glass transition temperature of about 15° C. to about 150° C., and, in an embodiment, about 35° C. to about 150° C., and, in an embodiment, about 50° C. to about 140° C. Within this range, the organic nanoparticles can exhibit good dispersion in the (meth)acrylic copolymer. The shell may include poly(alkyl methacrylate) having the above glass transition temperature. For example, the shell may include at least one selected from among poly(methyl methacrylate) (PMMA), poly(ethyl methacrylate), poly(propyl methacrylate), poly (butyl methacrylate), poly(isopropyl methacrylate), poly (isobutyl methacrylate), and poly(cyclohexyl methacrylate), without being limited thereto.

In an embodiment, in the organic particles, the core may be present in an amount of about 30 wt % to about 99 wt %, and, in an embodiment, about 40 wt % to about 95 wt %, and, in an embodiment, about 50 wt % to about 90 wt %.

Within this range, the adhesive layer can exhibit good foldability in a broad temperature range. In an embodiment, in the organic particles, the shell may be present in an amount of about 1 wt % to about 70 wt %, and, in an embodiment, about 5 wt % to about 60 wt %, and, in an embodiment, about 10 wt % to about 50 wt %. Within this range, the adhesive layer can exhibit good foldability in a broad temperature range.

In an embodiment, the organic particles may be optionally present in an amount of about 20 parts by weight or less, for example, 0, 1, 2, 3, 4, 5, 6, 7, 8, 9, 10, 11, 12, 13, 14, 15, 16, 17, 18, 19, or 20 parts by weight, and, in an embodiment, 0.1 parts by weight to 20 parts by weight, 0.5 parts by weight to 10 parts by weight, or 0.5 parts by weight to 8 parts by weight, relative to 100 parts by weight of the monomer mixture including the hydroxyl group-containing (meth) acrylate and the comonomer. Within this range, the organic particles can secure good properties in terms of modulus of the adhesive layer at high temperature, foldability of the adhesive layer at room temperature and high temperature, and viscoelasticity of the adhesive layer at low temperature and/or room temperature.

The inorganic particles are particles formed of an inorganic material and can assist in improvement in impact resistance of the surface protective film. The inorganic particles may include, for example, metal oxides, such as silica, zirconia, and the like, metal titanates, such as barium titanate and the like, sulfates, selenides, and tellurides. In an embodiment, the inorganic particles include silica to improve impact resistance while preventing or substantially preventing increase in haze of the adhesive layer by reducing a difference in index of refraction between the inorganic particles and the adhesive resin forming the adhesive layer.

The inorganic particles may include inorganic particles having a smaller average particle diameter than the organic particles. As a result, it is possible to easily realize the effects of the present invention. In an embodiment, the inorganic particles are nanoparticles and may have an average particle diameter (D50) of about 10 nm to about 200 nm, for example, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, 100 nm, 110 nm, 120 nm, 130 nm, 140 nm, 150 nm, 160 nm, 170 nm, 180 nm, 190 nm, or 200 nm, and, in an embodiment, 10 nm to 150 nm, and, in an embodiment, 10 nm to 100 nm. Within this range, the inorganic particles can improve impact resistance of the surface protective film without affecting foldability of the surface protective film and can have a luminous transmittance of 90% or more and a haze of less than 1% in the visible spectrum to secure good transparency of the adhesive layer.

In an embodiment, the inorganic particles may be optionally present in an amount of about 20 parts by weight or less, for example, 0, 1, 2, 3, 4, 5, 6, 7, 8, 9, 10, 11, 12, 13, 14, 15, 16, 17, 18, 19, or 20 parts by weight, and, in an embodiment, 0.1 parts by weight to 20 parts by weight, 0.5 parts by weight to 10 parts by weight, or 0.5 parts by weight to 8 parts by weight, relative to 100 parts by weight of the monomer mixture including the hydroxyl group-containing (meth) acrylate and the comonomer. Within this range, the inorganic particles can significantly improve impact resistance of the surface protective film without affecting flexibility of the surface protective film.

The initiator may be substantially the same as the initiator for the hard coating composition described above.

In an embodiment, the initiator may be present in an amount of about 0.001 parts by weight to about 10 parts by weight, and, in an embodiment, 0.001 parts by weight to 5 parts by weight, relative to 100 parts by weight of the monomer mixture including the hydroxyl group-containing (meth)acrylate and the comonomer. Within this range, the initiator allows formation of the adhesive layer while preventing or substantially preventing deterioration in transparency of the surface protective film.

The adhesive composition may further include a silicone-based (meth)acrylate. The silicone-based (meth)acrylate can improve foldability and adhesion of the adhesive layer to the base layer by improving wettability of the adhesive layer to the base layer.

The silicone-based (meth)acrylate may be a siloxane-modified mono-functional or polyfunctional (meth)acrylate and may be obtained from typical products well-known to those skilled in the art. For example, the silicone-based (meth)acrylate may include a modified silicone having a (meth)acrylate group at one end thereof and/or a modified silicone having a (meth)acrylate group at both ends thereof.

In an embodiment, the silicone-based (meth)acrylate may be present in an amount of about 5 parts by weight or less, for example, about 0.001 parts by weight to about 5 parts by weight, and, in an embodiment, 0.001 parts by weight to 3 parts by weight, relative to 100 parts by weight of the monomer mixture including the hydroxyl group-containing (meth)acrylate and the comonomer. Within this range, the surface protective film can secure good wettability when attached to the outermost surface of a foldable panel.

The adhesive composition may further include a crosslinking agent and a silane coupling agent. The crosslinking agent may include a bifunctional to hexafunctional (meth) acrylate-based photocurable monomer. Details thereof are well-known to those skilled in the art.

In another embodiment, the adhesive layer may include a silicone-based adhesive layer formed of a silicone-based adhesive composition including an alkenyl group-containing organopolysiloxane and a crosslinking agent.

The alkenyl group-containing organopolysiloxane may include a component (i) and/or a component (ii), where component (i) includes organopolysiloxane having at least one Si-coupled $C_3$ to $C_{10}$ alkenyl group per molecule, and component (ii) includes organopolysiloxane having at least one Si-coupled vinyl group per molecule.

In an embodiment, the component (i) may include an organopolysiloxane represented by the following Formula 1:

$$(R^1R^2SiO_{2/2})_x(R^3R^4SiO_{2/2})_y,$$

where $R^1$ is a $C_3$ to $C_{10}$ alkenyl group; $R^2$ is a $C_1$ to $C_{10}$ alkyl group; $R^3$ and $R^4$ are each independently a $C_1$ to $C_{10}$ alkyl group; and $0 < x \leq 1$, $0 \leq y < 1$, and $x+y=1$.

In an embodiment, x and y satisfy relations: $0.001 \leq x \leq 0.4$, $0.6 \leq y \leq 0.999$, and $x+y=1$, and, in an embodiment, $0.005 \leq x \leq 0.2$, $0.8 \leq y \leq 0.995$, and $x+y=1$.

In an embodiment, the component (ii) may be an organopolysiloxane having at least one Si-coupled vinyl group at a side chain thereof or at both ends thereof.

In an embodiment, the component (ii) may be an organopolysiloxane having at least one Si-coupled vinyl group at both ends thereof. For example, the component (ii) may be an organopolysiloxane represented by the following Formula 2:

$$R^5R^6R^7SiO(R^1R^2SiO_{2/2})_x(R^3R^4SiO_{2/2})_ySiR^8R^9R^{10},$$

where $R^1$, $R^2$, $R^3$, and $R^4$ are each independently a $C_1$ to $C_{10}$ alkyl group; $R^5$, $R^6$, and $R^7$ are each independently a vinyl group or a $C_1$ to $C_{10}$ alkyl group, at least one of $R^5$, $R^6$, and $R^7$ being a vinyl group; $R^8$, $R^9$, and $R^{10}$ are each independently a vinyl group or a $C_1$ to $C_{10}$ alkyl group; at least one of $R^8$, $R^9$, and $R^{10}$ being a vinyl group; and $0 \leq x \leq 1$, $0 \leq y \leq 1$, and $x+y=1$.

In another embodiment, the component (ii) may be an organopolysiloxane having at least one Si-coupled vinyl group at a side chain thereof. For example, the component (ii) may be an organopolysiloxane represented by the following Formula 3:

$$(R^1R^2SiO_{2/2})_x(R^3R^4SiO_{2/2})_y(R^5R^6SiO_{2/2})_z,$$

where $R^1$, $R^2$, $R^3$, $R^4$, $R^5$, and $R^6$ are each independently a $C_1$ to $C_{10}$ alkyl group, a vinyl group or a $C_6$ to $C_{10}$ aryl group, at least one of $R^1$ and $R^2$ being a vinyl group; and $0 < x \leq 1$, $0 \leq y < 1$, $0 \leq z < 1$, and $x+y+z=1$.

In another embodiment, the component (ii) may be an organopolysiloxane having at least one Si-coupled vinyl group at a side chain thereof. For example, the component (ii) may be an organopolysiloxane represented by the following Formula 4:

$$(R^1R^2SiO_{2/2})_x(R^3R^4SiO_{2/2})_y,$$

where $R^1$, $R^2$, $R^3$, and $R^4$ are each independently a $C_1$ to $C_{10}$ alkyl group, a vinyl group or a $C_6$ to $C_{10}$ aryl group, at least one of $R^1$ and $R^2$ being a vinyl group; and $0 < x1$, $0 \leq y < 1$, and $x+y=1$.

The crosslinking agent may include a hydrogen organopolysiloxane having at least two Si—H bonds in a molecule thereof. In an embodiment, the crosslinking agent may be represented by the following Formula 5:

$$R^4R^5R^6SiO(R^1R^2SiO_{2/2})_x(HR^3SiO_{2/2})_ySiR^7R^8R^9,$$

where $R^1$, $R^2$, $R^3$, $R^4$, $R^5$, $R^6$, $R^7$, $R^8$, and $R^9$ are each independently $C_1$ to $C_{10}$ alkyl group; and $0 \leq x < 1$, $0 < y \leq 1$, and $x+y=1$.

The adhesive composition may further include an organopolysiloxane resin. The organopolysiloxane resin includes an $R^1R^2R^3SiO_{1/2}$ unit ("M unit") and an $SiO_{4/2}$ unit ("Q unit"). In this formula, $R^1$, $R^2$, and $R^3$ are each independently a $C_1$ to $C_6$ alkyl group or a $C_2$ to $C_{10}$ alkenyl group, for example, a methyl group, an ethyl group, an isopropyl group, or a propyl group, such as an N-propyl group and the like, a vinyl group, or an alkenyl group, such as an allyl group and the like.

The adhesive composition may further include a hydrosilylation catalyst. The hydrosilylation catalyst promotes reaction between the organopolysiloxane and the crosslinking agent. The hydrosilylation catalyst may include a platinum-based catalyst, a ruthenium-based catalyst, or an osmium-based catalyst, for example, a typical platinum catalyst well-known to those skilled in the art. For example, the hydrosilylation catalyst may include chloroplatinic acid, an alcoholic solution of chloroplatinic acid, a complex of chloroplatinic acid and an olefin, a complex of chloroplatinic acid and an alkenyl siloxane, and the like.

An optical member according to one or more embodiments of the present invention includes the surface protective film according to an embodiment of the present invention.

According to an embodiment, the optical member includes an optical element and the surface protective film of an embodiment of the present invention stacked on at least one surface of the optical element.

The optical element may include any of various optical components in a display apparatus. In one or more embodiments, since the surface protective film according to embodiments of the present invention includes the hard coating layer, the optical element includes a window film.

The optical member may include the surface protective film according to an embodiment of the present invention and the window film sequentially stacked one above another when viewed at a viewer side.

The window film may include a base layer and a hard coating layer formed of a silicone resin for foldability, without being limited thereto. In an embodiment, the window film include a base layer and a hard coating layer formed on an upper surface of the base layer, and may further include a functional layer, for example, an anti-fingerprint layer, on an upper surface of the hard coating layer.

A display apparatus according to one or more embodiments of the present invention includes the surface protective film according to an embodiment of the present invention. The display apparatus may include a flexible display apparatus or a non-flexible display apparatus.

According to an embodiment, the display apparatus may include an optical element and the surface protective film of an embodiment of the present invention stacked on at least one surface of the optical element.

The optical element may include any of various optical components in a display apparatus. In one or more embodiments, since the surface protective film according to embodiments of the present invention includes the hard coating layer, the optical element includes a window film. The optical member may include the surface protective film according to an embodiment of the present invention and the window film sequentially stacked one above another when viewed at a viewer side.

The window film may include a base layer and a hard coating layer formed of a silicone resin for foldability, without being limited thereto.

The display apparatus may further include a display drive unit for driving the display apparatus. The display drive unit may include an optical element including any of an organic light emitting diode (OLED), an LED, a QLED (quantum dot light emitting diode), an LCD element, and a quantum dot element, for example. The display drive unit may further include a substrate for maintaining the optical element.

The display apparatus may further include a polarizing plate. The polarizing plate can realize the display apparatus or increase contrast ratio of the display apparatus through polarization of internal light or by preventing or substantially preventing reflection of external light. In an embodiment, the polarizing plate may be composed of a polarizer alone. In another embodiment, the polarizing plate may include a polarizer and a protective film on one or both surfaces of the polarizer. In another embodiment, the polarizing plate may include a polarizer and a protective coating layer on one or both surfaces of the polarizer. Each of the polarizer, the protective film, and the protective coating layer may be obtained from typical products well-known to those skilled in the art.

The display apparatus may further include a touchscreen panel. When touched by a conductor, such as a human body or a stylus, the touchscreen panel may generate electrical signals through detection of variation in capacitance, whereby the display drive unit can be driven in response to the electrical signals.

Next, the present invention will be described in further detail with reference to some examples. However, it should be noted that these examples are provided for illustration and should not be construed in any way as limiting the invention.

Components of the hard coating composition used in Examples and Comparative Examples are as follows.

(A) First urethane (meth)acrylate oligomer: UA11064 (Entis Co., Ltd., deca-functional (meth)acrylate-based, weight average molecular weight: 2,000, elongation: 6%, solid content: 100%)

(B) Second urethane (meth)acrylate oligomer: CHTF-9696AN (Chemton Co., Ltd., hexa-functional (meth) acrylate-based, weight average molecular weight: 4,500, elongation: 16%, solid content: 83%)

(C) (Meth)acrylate monomer: SR499 (Sartomer Co., Ltd., trifunctional (meth)acrylate-based, solid content: 100%)

(D) Alumina: LAA530U (Ranco Co., Ltd., average particle diameter (D50): 15 nm, solid content: 30%)

(E) Fluorine-based additive: RS-78 (DIC Co., Ltd., solid content: 10%)

(F) Initiator: Irgacure 184 (BASF, solid content: 25%)

(G) Solvent: methyl ethyl ketone (Samchun Chemicals Co., Ltd.)

For the first urethane (meth)acrylate oligomer and the second urethane (meth)acrylate oligomer, elongation was evaluated by an Instron test method in accordance with JIS K7311.

Example 1

(1) Preparation of Hard Coating Composition

In terms of solid content, 30 parts by weight of the first urethane (meth)acrylate oligomer, 60 parts by weight of the second urethane (meth)acrylate oligomer, 7 parts by weight of the (meth)acrylate monomer, 3 parts by weight of alumina particles, 0.4 parts by weight of the fluorine-based additives, and 2.5 parts by weight of the initiator were mixed together with 50 parts by weight of methyl ethyl ketone as a solvent, thereby preparing a hard coating composition.

(2) Preparation of Adhesive Composition ((Meth)Acrylic Adhesive Layer)

Organic nanoparticles were prepared by emulsion polymerization. The organic nanoparticles included 35 wt % of shells and 65 wt % of cores in which the cores were poly(butyl acrylate) and the shells were poly(methyl methacrylate), and had an average particle diameter of 200 nm and an index of refraction of 1.48.

As inorganic nanoparticles, silica particles (Optisol-ASAM0151, Racno Co., Ltd., silica average particle diameter (D50): 90 nm) were used.

100 parts by weight of a monomer mixture comprising 20 parts by weight of 4-hydroxybutyl acrylate and 80 parts by weight of 2-ethylhexyl acrylate, and 0.03 parts by weight of an initiator (Irgacure 651, 2,2-dimethoxy-2-phenylacetophenone, BASF) were mixed in a reactor. After replacing dissolved oxygen in the reactor with nitrogen gas, the mixture was partially polymerized through UV irradiation using a low pressure mercury lamp, thereby preparing a viscous liquid having a viscosity of 5,000 cP at 25° C.

In terms of solid content, 0.5 parts by weight of an initiator (Irgacure 184, 1-hydroxycyclohexylphenylketone, BASF), 5 parts by weight of the organic nanoparticles and 5 parts by weight of the inorganic nanoparticles were added to the reactor and mixed with the viscous liquid to prepare an adhesive composition.

The adhesive composition was deposited onto one surface of a release film (polyethylene terephthalate film) and was irradiated with UV light at a dose of 2,000 mJ/cm$^2$, thereby preparing an adhesive sheet of a 25 μm thick adhesive layer and the PET film. The adhesive layer had a storage modulus of 100 kPa at −20° C. and a storage modulus of 20 kPa at 60° C. The storage modulus was measured using a dynamic viscoelastic instrument (ARES G2, TA Instrument) by the method described below.

(3) Preparation of Surface Protective Film

The hard coating composition was coated on an upper surface of a cast polyurethane film (prepared by the solution casting method) (thickness: 100 μm, haze: 1%) used as a base layer and was dried at 80° C. for 2 minutes, followed by irradiation at a dose of 300 mJ/cm$^2$ under a light source (metal halide lamp) while purging with nitrogen to form a hard coating layer (thickness: 2 μm) on the upper surface of the base layer.

The prepared adhesive composition was coated on a lower surface of the cast polyurethane film and was irradiated with UV light at a dose of 2,000 mJ/cm$^2$ to form an adhesive layer (thickness: 25 μm) on the lower surface of the base layer, thereby preparing a surface protective film.

Examples 2 to 4

A surface protective film was manufactured in the same manner as in Example 1 except that the cast polyurethane film and the adhesive layer were changed as listed in Table 1.

Example 5

(1) Preparation of Adhesive Composition (Silicone-Based Adhesive Layer)

A silicone resin (Shin-Etsu Chemical Co., Ltd., X-40-3229, K3700K) was dissolved in toluene to have a solid content of 30% and was mixed for 30 minutes. Then, 0.5 parts by weight of Pt catalyst was added to the mixture and mixed for 30 minutes, thereby preparing a silicone-based adhesive composition.

An adhesive layer formed of the silicone-based adhesive composition had a storage modulus of 200 kPa at −20° C. and a storage modulus of 20 kPa at 60° C. The storage modulus was measured using a dynamic viscoelastic instrument (ARES G2, TA Instrument) by the method described below. The adhesive layer having a thickness of 10 μm had an adhesive strength of 40 gf/25 mm or more with respect to an anti-fingerprint layer.

(2) Preparation of Surface Protective Film

The hard coating composition prepared in Example 1 was coated on an upper surface of a cast polyurethane film used as a base layer and was dried at 80° C. for 2 minutes, followed by irradiation at a dose of 300 mJ/cm$^2$ under a light source (metal halide lamp) while purging with nitrogen to form a hard coating layer (thickness: 2 μm) on the upper surface of the base layer.

The prepared adhesive composition was coated on a lower surface of the cast polyurethane film, dried at 130° C. for 3 min, and was left at 40° C. for 3 days to form an adhesive layer (thickness: 15 μm) on the lower surface of the base layer, thereby preparing a surface protective film.

Comparative Example 1

A surface protective film was manufactured in the same manner as in Example 1 except that a thermoplastic polyurethane (TPU) film (Sheedom Co., Ltd., haze: 1%) was used instead of the cast polyurethane film.

Comparative Example 2

A surface protective film was manufactured in the same manner as in Example 1 except that a thermoplastic polyurethane (TPU) film (Sheedom Co., Ltd.) was used instead of the cast polyurethane film, and an adhesive layer was formed using silicone adhesives (Shin-Etsu Chemical Co., Ltd.).

Comparative Example 3

A surface protective film was manufactured in the same manner as in Example 1 except that a cast polyurethane film of Table 1 was used.

The surface protective films of the Examples and Comparative Examples were evaluated as to the following properties and results are shown in Table 1.

(1) Young's modulus of base layer (unit: MPa): Young's modulus at 25° C. was evaluated with respect to the base layer of each of the surface protective films prepared in the Examples and Comparative Examples. Young's modulus was evaluated using a V-type specimen in accordance with ASTM D638. Specifically, Young's modulus was evaluated at 100 mm/min using a UTM system (Intron Technology Co., Ltd.) through a tensile test experiment.

(2) Storage modulus of base layer (unit: MPa): Storage moduli at −20° C. and at 85° C. were evaluated with respect to the base layer of each of the surface protective films prepared in the Examples and Comparative Examples. Storage modulus was measured using a dynamic mechanical analyzer (DMA) system. Specifically, the storage moduli at −20° C. and at 85° C. were measured in a tension test mode at a frequency of 1 Hz while raising the temperature from −70° C. to 120° C. at a heating rate: 2° C./min.

(3) Fracture elongation of base layer (unit: %): Fracture elongation was evaluated with respect to the base layer of each of the surface protective films prepared in the Examples and Comparative Examples. Fracture elongation was evaluated using a V-type specimen at 25° C. in accordance with ASTM D638. Specifically, fracture elongation was evaluated at 100 mm/min using a UTM system (Intron Technology Co., Ltd.) through a tensile test experiment.

(4) Storage modulus of hard coating layer and base layer (unit: MPa): Storage moduli at −20° C. and at 85° C. were evaluated with respect to a laminate of the hard coating layer and the base layer of each of the surface protective films prepared in the Examples and Comparative Examples. Storage modulus was measured using a dynamic mechanical analyzer (DMA) system. Specifically, the storage moduli at −20° C. and at 85° C. were measured in a tension test mode at a frequency of 1 Hz while raising the temperature from −70° C. to 120° C. at a heating rate of 2° C./min.

(5) Pen drop impact resistance: A specimen was prepared by sequentially stacking a polyethylene terephthalate (PET) film (thickness: 38 μm), an adhesive film (thickness: 25 μm, storage modulus of 0.03 MPa at 25° C.), and a PET film (thickness: 125 μm) on a lower surface of the adhesive layer of each of the surface protective films prepared in the Examples and Comparative Examples. A ball-point pen (BIC Co., Ltd., crystal material, ϕ0.7 mm pen) was dropped from a predetermined height above the hard coating layer of the specimen to evaluate an initial height at which dents were formed on the lowermost PET film (thickness: 125 μm). The maximum height at which dents were formed thereon was evaluated for simulation or comparison of a height of a bright spot where a pixel would be broken and a breaking height of a window glass in an actual foldable panel, and could be confirmed through a magnifying glass or an optical microscope. A higher initial height indicates better pen drop impact resistance. A height of 18 cm or more means that the surface protective film has good impact resistance to be applicable to a panel in practice.

(6) Flexural reliability: A specimen (length×width: 10 cm×5 cm) was prepared by stacking a polyethylene terephthalate film (thickness: 75 μm) on a lower surface of the adhesive layer of each of the surface protective films prepared in the Examples and Comparative Examples. The specimen was evaluated at −20° C. and 60° C. as to generation of cracks at a bent portion of the specimen upon repetition of 100,000 cycles of folding and unfolding the specimen at the polyethylene terephthalate film side such that a bent portion of the specimen had a radius of curvature of 1.5 mm, in which each cycle refers to an operation of folding the specimen in half in the longitudinal direction thereof, followed by unfolding the specimen. Generation of no cracks even after 100,000 cycles of folding and unfolding was rated as ○, generation of cracks once was rated as Δ, and generation of cracks twice or more was rated as X.

(7) Appearance: Upon observation of external appearance of each of the surface protective films of the Examples and Comparative Examples at the hard coating layer side with the naked eye by irradiating the surface protective film with light from a Xenon lantern, generation of no stripe patterns, gel, and/or opaqueness on the entirety of the surface protective film was rated as ○, and even slight generation of stripe patterns, gel, and/or opaqueness thereon was rated as X.

(8) Scratch resistance: A specimen was prepared by stacking a polyethylene terephthalate film (thickness: 75 μm) on a lower surface of an adhesive layer of a protective film for window films of the Examples and Comparative Examples. With the specimen secured to a surface property tester (Heidon Co., Ltd.) and #0000 steel wool mounted thereon, a weight of 500 g was reciprocated 10 times at a scale of 50 mm on the surface of the hard coating layer 10 to evaluate the number of scratches thereon. A smaller number of scratches indicates higher scratch resistance. In evaluation of scratch resistance, two or fewer scratches mean that the surface protective film has high scratch resistance and can be applied to a display apparatus (less than 2: O, 2 to 10: Δ, greater than 10: X).

(9) Wear resistance: A surface of the hard coating layer of each of the surface protective films of the Examples and Comparative Examples was observed with the naked eye after rubbing the surface of the hard coating layer plural times using an eraser-fixed tip under a load of 500 g. An initial number of scratches on the surface of the hard coating layer was evaluated.

TABLE 1

| | | Example | | | | | Comparative Example | | |
|---|---|---|---|---|---|---|---|---|---|
| | | 1 | 2 | 3 | 4 | 5 | 1 | 2 | 3 |
| Base layer | Kind | Cast polyurethane film | Cast polyurethane film | Cast polyurethane film | Cast polyurethane film | Cast polyurethane film | TPU | TPU | Cast polyurethane film |

TABLE 1-continued

| | | Example | | | | | Comparative Example | | |
|---|---|---|---|---|---|---|---|---|---|
| | | 1 | 2 | 3 | 4 | 5 | 1 | 2 | 3 |
| | Thickness | 100 | 75 | 100 | 200 | 100 | 100 | 100 | 100 |
| | Young's modulus at 25° C. | 110 | 110 | 110 | 110 | 110 | 40 | 40 | 39 |
| | Storage modulus at −20° C. | 1050 | 1050 | 1050 | 1050 | 1050 | 800 | 800 | 600 |
| | Storage modulus at 85° C. | 65 | 65 | 65 | 65 | 65 | 9 | 9 | 70 |
| | Fracture elongation | 600 | 600 | 600 | 600 | 600 | 600 | 600 | 300 |
| Adhesive layer | Kind | (meth) acrylic | (meth) acrylic | (meth) acrylic | (meth) acrylic | Silicone-based | (meth) acrylic | Silicone-based | (meth) acrylic |
| | Thickness | 25 | 25 | 15 | 25 | 15 | 25 | 10 | 25 |
| Storage modulus of laminate of base layer and hard coating layer (at −20° C.) | | 1105 | 1105 | 1105 | 1105 | 1105 | 810 | 810 | 615 |
| Storage modulus of laminate of base layer and hard coating layer (at 85° C.) | | 69 | 69 | 69 | 69 | 69 | 11 | 11 | 76 |
| Impact resistance | | 20 | 18 | 19 | 27 | 18 | 13 | 10 | 10 |
| Flexural reliability | at −20° C. | ○ | ○ | ○ | ○ | ○ | ○ | ○ | ○ |
| | at 60° C. | ○ | ○ | ○ | ○ | ○ | Δ | Δ | ○ |
| | Appearance | ○ | ○ | ○ | ○ | ○ | X | X | ○ |
| Scratch resistance | | ○ | ○ | ○ | ○ | ○ | Δ | Δ | Δ |
| Wear resistance | | 1,000 or more | 1,000 or more | 1,000 or more | 1,000 or more | 1,000 or more | 1,000 or more | 1,000 or more | 1,000 or more |

As shown in Table 1, the surface protective films according to the present invention had good impact resistance, good folding reliability at both low temperature and high temperature, and good appearance. In addition, the surface protective film exhibited good scratch resistance and good wear resistance. Accordingly, the present invention provides a surface protective film that has good impact resistance and good folding reliability at low temperature and high temperature. Further, the present invention provides a surface protective film that achieves improvement in wear resistance, scratch resistance, and slip resistance. Further, the present invention provides a surface protective film that has good external appearance.

Conversely, as shown in Table 1, the surface protective films of the Comparative Example failed to achieve the effects of the present invention.

Although some embodiments have been described herein, it should be understood that various modifications, changes, alterations, and equivalent embodiments may be made by those skilled in the art without departing from the spirit and scope of the present invention.

What is claimed is:

1. A surface protective film comprising:
a hard coating layer, a base layer, and an adhesive layer sequentially stacked in the stated order,
wherein a laminate of the hard coating layer and the base layer has a storage modulus of about 900 MPa to about 1500 MPa at −20° C. and a storage modulus of about 15 MPa to about 100 MPa at 85° C.,
wherein the base layer has a storage modulus of about 900 MPa to about 1500 MPa at −20° C. and a storage modulus of about 15 MPa to about 100 MPa at 85° C.,
wherein the base layer comprises a cast polyurethane film, and wherein the hard coating layer is formed of a urethane (meth)acrylate-based hard coating composition consisting of: a first urethane (meth)acrylate oligomer; a second urethane (meth)acrylate oligomer; a (meth) acrylate monomer; alumina particles; an initiator; a fluorine-based additive; and optionally, a solvent.

2. The surface protective film according to claim 1, wherein the base layer has a thickness of about 75 μm to about 200 μm.

3. The surface protective film according to claim 1, wherein the base layer has a fracture elongation of about 200% or more, as measured at 25° C.

4. The surface protective film according to claim 1, wherein the base layer has a storage modulus of about 950 MPa to about 1200 MPa at −20° C. and a storage modulus of about 50 MPa to about 90 MPa at 85° C.

5. The surface protective film according to claim 1, wherein the base layer has a haze of about 1% or less.

6. The surface protective film according to claim 1, wherein the adhesive layer has a storage modulus of about 10 kPa to about 500 kPa at −20° C. and a storage modulus of about 10 kPa to about 500 kPa at 60° C.

7. The surface protective film according to claim 1, wherein the hard coating layer has a water contact angle of about 100° or more at 25° C.

8. The surface protective film according to claim 1, wherein the surface protective film has a number of scratches of two or fewer as measured by preparing a specimen by stacking a polyethylene terephthalate film having a thickness of 75 μm on a lower surface of the adhesive layer of the surface protective film, securing the specimen to a surface property tester with a #0000 steel wool mounted thereon, and reciprocating scratching a surface of the hard coating layer 10 times with a weight of 500 g and at a scale of 50 mm to evaluate the number of scratches thereon.

9. The surface protective film according to claim 1, wherein the alumina particles are about 0.01 parts to about 10 parts by weight based on a total sum of 100 parts by weight of the first urethane (meth)acrylate oligomer, the second urethane (meth)acrylate oligomer, the (meth)acrylate monomer, and the alumina particles.

10. The surface protective film according to claim 1, wherein the adhesive layer comprises a (meth)acrylic adhesive layer formed of an adhesive composition comprising: a monomer mixture for a hydroxyl group-containing (meth) acrylic copolymer; particles or a particle mixture comprising at least one selected from among organic particles and inorganic particles; and an initiator, or a silicone-based adhesive layer formed of an adhesive composition comprising an alkenyl group-containing organopolysiloxane.

11. The surface protective film according to claim 10, wherein the monomer mixture comprises about 5 wt % to about 40 wt % of a hydroxyl group-containing (meth) acrylate and about 60 wt % to about 95 wt % of a comonomer.

12. The surface protective film according to claim 10, wherein the alkenyl group-containing organopolysiloxane comprises at least one selected from among a component (i) and a component (ii), wherein the component (i) comprises organopolysiloxane having at least one Si-coupled $C_3$ to $C_{10}$ alkenyl group per molecule; and the component (ii) comprises organopolysiloxane having at least one Si-coupled vinyl group per molecule.

13. The surface protective film according to claim 10, wherein the inorganic particles comprise at least one selected from among metal oxides, metal titanates, sulfides, selenides, and tellurides.

14. The surface protective film according to claim 10, wherein the organic particles comprise core-shell type organic nanoparticles.

15. The surface protective film according to claim 14, wherein the core-shell type organic nanoparticles satisfy the following Relation (1):

$$Tg(c) < Tg(s),$$

where Tg(c) is a glass transition temperature (unit: ° C.) of the core, and Tg(s) is a glass transition temperature (unit: ° C.) of the shell.

16. A display apparatus comprising the surface protective film according to claim 1.

17. An optical member comprising the surface protective film according to claim 1.

18. The optical member according to claim 17, comprising: a window film; and the surface protective film formed on a surface of the window film.

19. A surface protective film comprising:

a hard coating layer, a base layer, and an adhesive layer sequentially stacked in the stated order, wherein the base layer comprises a cast polyurethane film formed by solution casting and has a Young's modulus of about 80 MPa to about 500 MPa at 25° C., and wherein the base layer has a storage modulus of about 900 MPa to about 1500 MPa at −20° C. and a storage modulus of about 15 MPa to about 100 MPa at 85° C., and wherein the hard coating layer is formed of a urethane (meth)acrylate-based hard coating composition consisting of: a first urethane (meth)acrylate oligomer; a second urethane (meth)acrylate oligomer; a (meth) acrylate monomer; alumina particles; an initiator; a fluorine-based additive; and optionally, a solvent.

20. The surface protective film according to claim 19, wherein a laminate of the hard coating layer and the base layer has a storage modulus of about 900 MPa to about 1500 MPa at −20° C. and a storage modulus of about 15 MPa to about 100 MPa at 85° C.

* * * * *